United States Patent
Yang

(10) Patent No.: US 9,336,022 B2
(45) Date of Patent: May 10, 2016

(54) UNIVERSAL SERIAL BUS (USB) DEVICE AND A USB SYSTEM INCLUDING THE SAME

(75) Inventor: Seung-Soo Yang, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 303 days.

(21) Appl. No.: 13/468,707

(22) Filed: May 10, 2012

(65) Prior Publication Data

US 2013/0042028 A1 Feb. 14, 2013

(30) Foreign Application Priority Data

Aug. 12, 2011 (KR) .................. 10-2011-0080733

(51) Int. Cl.
*G06F 3/00* (2006.01)
*G06F 9/445* (2006.01)

(52) U.S. Cl.
CPC ........ *G06F 9/44521* (2013.01); *G06F 9/44505* (2013.01)

(58) Field of Classification Search
CPC  G06F 9/4413; G06F 9/44521; G06F 9/44505
USPC ......................................................... 710/14
See application file for complete search history.

(56) References Cited

U.S. PATENT DOCUMENTS

| 7,093,031 B2 | 8/2006 | Ray et al. | |
| 2005/0246455 A1* | 11/2005 | Bhesania et al. | 710/10 |
| 2007/0186070 A1* | 8/2007 | Federa et al. | 711/163 |
| 2008/0059981 A1* | 3/2008 | Belanger-Basset et al. | 719/322 |
| 2008/0195790 A1* | 8/2008 | Self | 710/306 |
| 2009/0089569 A1* | 4/2009 | Baribault et al. | 713/2 |
| 2012/0324067 A1* | 12/2012 | Hari et al. | 709/222 |

FOREIGN PATENT DOCUMENTS

| KR | 1020070069333 | 7/2007 |
| KR | 1020080064327 | 7/2008 |

* cited by examiner

*Primary Examiner* — Idriss N Alrobaye
*Assistant Examiner* — Brooke Taylor
(74) *Attorney, Agent, or Firm* — F. Chau & Associates, LLC

(57) ABSTRACT

A universal serial bus (USB) device includes a first memory and a second memory. The first memory is configured to store L different function drivers, and during a first operation, the second memory is configured to be loaded with M different function drivers from the first memory and, during a second operation, the second memory is configured to maintain N function drivers among the M function drivers while being loaded with A different function drivers from the first memory, wherein M≤L, N<M, and A<L.

14 Claims, 14 Drawing Sheets

UNIVERSAL SERIAL BUS (USB) DEVICE AND A USB SYSTEM INCLUDING THE SAME

CROSS-REFERENCE TO RELATED APPLICATION

This application claims priority under 35 U.S.C. §119 to Korean Patent Application No. 10-2011-0080733 filed on Aug. 12, 2011 in the Korean Intellectual Property Office, the disclosure of which is incorporated by reference herein in its entirety.

BACKGROUND

1. Technical Field

The present inventive concept relates to a universal serial bus (USB) device and a USB system including the same.

2. Discussion of the Related Art

Universal serial bus (USB) is an industry standard that defines the cables, connectors and communications protocols used in a bus for connection, communication and power supply between computers and electronic devices, for example.

A USB device may operate in various modes and provide a different function in each mode. The USB device requires a different combination of function drivers in each mode. Therefore, when the mode of the USB device is changed, function drivers needed for the changed mode should be loaded to a volatile memory of the USB device.

Function drivers may be loaded from a nonvolatile memory to the volatile memory. Combinations of function drivers required for each mode may be stored in the nonvolatile memory. For example, a first combination may be a combination of function drivers needed to operate the USB device in a first mode, and a second combination may be a combination of function drivers needed to operate the USB device in a second mode. Therefore, when the mode of the USB device is changed, all function drivers loaded in the volatile memory may be unloaded. Then, function drivers included in a combination of function drivers needed for the changed mode may be loaded from the nonvolatile memory to the volatile memory.

However, some of the function drivers present in the volatile memory before a mode change of the USB device may be required by the new mode. Therefore, the unloading of all the function drivers from the volatile memory may be inefficient.

SUMMARY

Exemplary embodiments of the present inventive concept provide a universal serial bus (USB) device and a USB system which can increase loading and unloading efficiency of function drivers. This can be done by unloading, from a volatile memory, function drivers that are not necessary for a target mode to which a current mode of the USB device is to be changed, while maintaining, in the volatile memory, function drivers that can be used in the target mode, and loading the rest of the required function drivers to the volatile memory.

According to an exemplary embodiment of the present inventive concept, there is provided a USB device comprising a first memory configured to store L different function drivers, and a second memory, wherein during a first operation, the second memory is configured to be loaded with M different function drivers from the first memory and, during a second operation, the second memory is configured to maintain N function drivers among the M function drivers while being loaded with A different function drivers from the first memory, wherein M≤L, N<M, and A<L.

During the second operation, U function drivers are unloaded from the second memory, wherein U=M−N and U does not include the N function drivers.

When the M function drivers are loaded to the second memory, regions of the second memory are allocated to the M function drivers, and endpoint resources are allocated to the M function drivers.

When the U function drivers are unloaded from the second memory, regions of the second memory allocated to the U function drivers are freed, and endpoint resources allocated to the U function drivers are freed.

The L function drivers comprise first through L-th function drivers, and one function driver for each of the first through L-th function drivers is stored in the first memory.

The first memory comprises a composite configuring program, wherein the composite configuring program loads the M function drivers and the A function drivers from the first memory to the second memory.

The M function drivers are used for the USB device to operate in a first mode, and the N function drivers and the A function drivers are used for the USB device to operate in a second mode.

During the first operation, the M function drivers are allocated with the same interface numbers as interface numbers of M host function drivers in a first file of a USB host, and during the second operation, interface numbers of the N function drivers are maintained while the A function drivers are allocated with the same interface numbers as interface numbers of A host function drivers in a second file of the USB host.

The first and second files comprise Inf files.

The M function drivers are different from the A function drivers.

The first memory is a nonvolatile memory, and the second memory is a volatile memory.

According to an exemplary embodiment of the present inventive concept, there is provided a USB system comprising a USB host comprising first and second files which store interface numbers of host function drivers, and a USB device, wherein the USB device comprises a first memory configured to store L different function drivers, and a second memory, wherein during a first operation, the second memory is configured to be loaded with M different function drivers from the first memory and, during a second operation, the second memory is configured to maintain N function drivers among the M function drivers while being loaded with A different function drivers from the first memory, wherein M≤L, N<M and A<L.

The M function drivers are allocated with the same interface numbers as interface numbers stored in the first file during the first operation, and interface numbers allocated to the N function drivers are maintained during the second operation.

During the second operation, the A function drivers are allocated with the same interface numbers as interface numbers stored in the second file.

During the second operation, U function drivers are unloaded from the second memory, wherein U=M−N and U does not include the N function drivers.

The L function drivers comprise first through L-th function drivers, and one function driver for each of the first through L-th function drivers is stored in the first memory.

The first memory is a nonvolatile memory, and the second memory is a volatile memory.

The first and second files comprise Inf files.

According to an exemplary embodiment of the present inventive concept, a USB device includes a first memory, wherein in response to a signal indicating a mode change of the USB device the first memory is configured to remove at least one function driver, maintain at least one function driver and receive at least one function driver.

The USB device may further include a second memory configured to store a plurality of function drivers.

BRIEF DESCRIPTION OF THE DRAWINGS

The above and other features of the present inventive concept will become more apparent by describing in detail exemplary embodiments thereof with reference to the attached drawings, in which.

DETAILED DESCRIPTION OF THE EMBODIMENTS

Exemplary embodiments of the present inventive concept will be described more fully hereinafter with reference to the accompanying drawings. The present inventive concept may, however, be embodied in many different forms and should not be construed as being limited to the embodiments set forth herein.

It will be understood that when an element is referred to as being "connected to," or "coupled to" another element, it can be directly connected to or coupled to the another element or intervening elements may be present. Like numbers may refer to like elements throughout the drawings and specification.

As used herein, the singular forms "a," "an" and "the" are intended to include the plural forms as well, unless the context clearly indicates otherwise.

Figure 1:
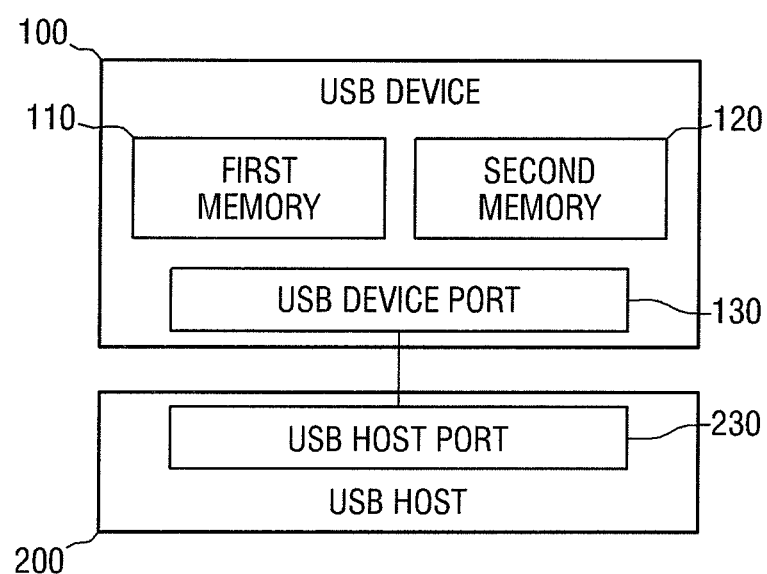
FIGS. 1 and 2 are block diagrams of a universal serial bus (USB) device and a USB system according to an exemplary embodiment of the present inventive concept.
Figure 2:
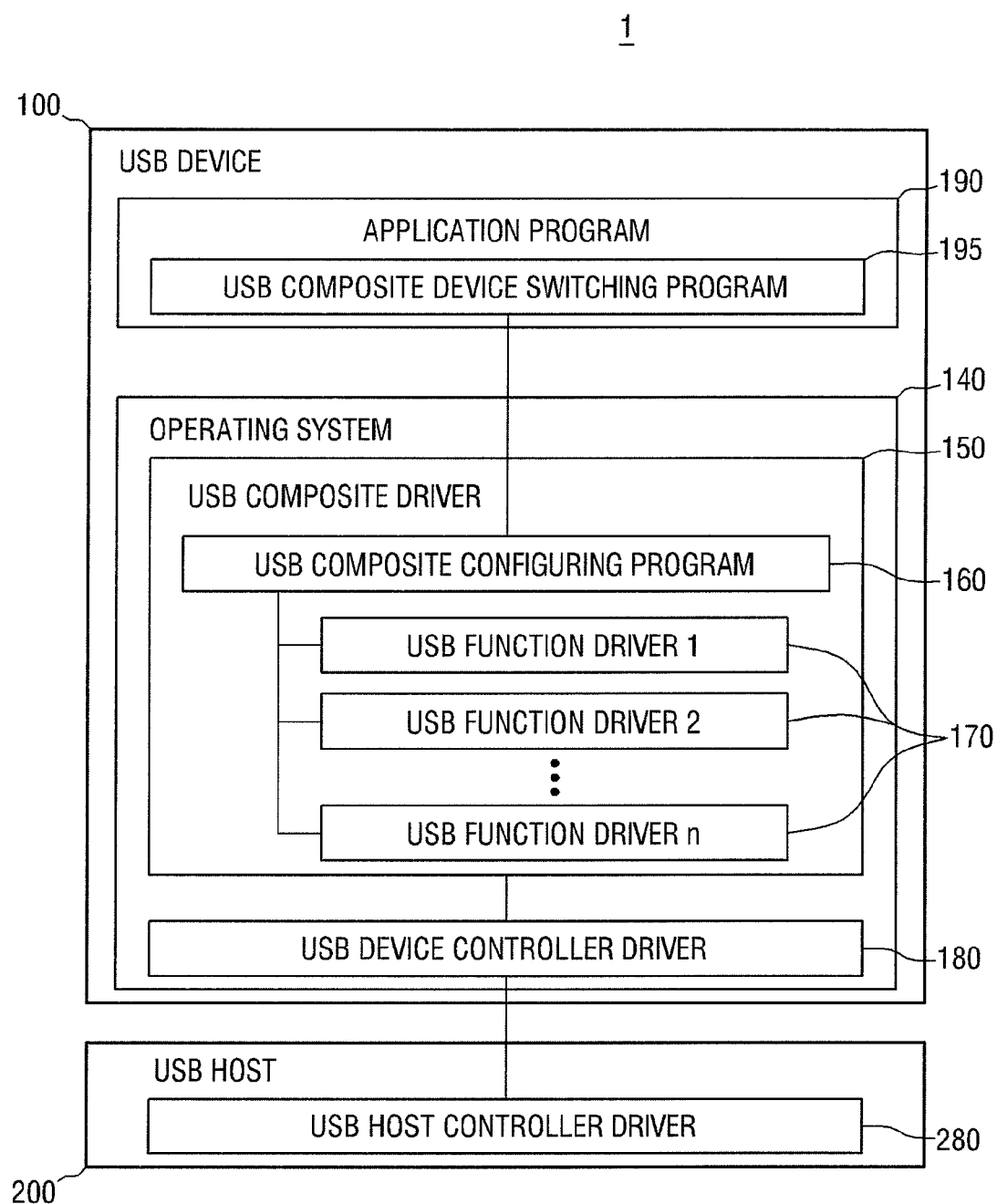

Hereinafter, a universal serial bus (USB) device and a USB system according to an exemplary embodiment of the present inventive concept will be described with reference to FIGS. 1 and 2. FIGS. 1 and 2 are block diagrams of a USB device 100 and a USB system 1 according to an exemplary embodiment of the present inventive concept.

Referring to FIG. 1, the USB system 1 includes the USB device 100 and a USB host 200.

The USB device 100 may include a first memory 110, a second memory 120, and a USB device port 130. The first memory 110 may be a nonvolatile memory, and the second memory 120 may be a volatile memory. The USB device port 130 is physically connected to a USB host port 230 of the USB host 200 for USB communication. The USB device port 130 and the USB host port 230 may be connected directly or by a cable. However, the present inventive concept is not limited thereto. For example, the USB device port 130 and the USB host port 230 may perform USB communication with each other without being physically connected. In other words, wirelessly.

The USB host 200 may include the USB host port 230. As described above, the USB host port 230 may perform USB communication with the USB device port 130 of the USB device 100 in a wired/wireless manner.

Referring to FIG. 2, an operating system (OS) 140 may be loaded into the USB device 100. The OS 140 may be, but is not limited to, an ANDROID™ operating system.

The USB device 100 may include a USB composite driver 150 and a USB device controller driver 180. The USB composite driver 150 may be defined as a driver which includes USB function drivers 170. Each of the USB function drivers 170 may be, but is not limited to, a USB mass storage (UMS) function driver, a remote network driver interface specification (RNDIS) function driver, or a media transfer protocol (MTP) function driver.

The USB device 100 may operate in various modes. The USB device 100 may provide a different function in each mode. For example, the USB device 100 may operate in a tethering mode. In the tethering mode, the USB device 100 may function as a tethering device. To operate in a certain mode, the USB device 100 may need certain USB function drivers. The types of USB function drivers needed may vary according to the mode of the USB device 100.

USB function drivers needed in each mode of the USB device 100 may be configured by a USB composite configuring program 160. Specifically, the USB composite configuring program 160 may configure the USB composite driver 150 by activating USB function drivers needed to operate the USB device 100 in a certain mode and deactivating USB function drivers not needed for that mode. For example, USB function drivers needed to operate the USB device 100 in a certain mode may be activated by being loaded to the second memory 120 (see FIG. 1), and USB function drivers not needed for that mode may be deactivated by being unloaded from the second memory 120.

In the USB device 100, an application program 190 such as a USB composite device switching program 195 may be executed. The USB composite device switching program 195 may receive information about a target mode in which the USB device 100 is to be operated and generate a switching signal based on the received information. The switching signal may include the information about the target mode to which the current mode of the USB device 100 is to be changed.

The switching signal may be transmitted from the USB composite device switching program 195 to the USB composite configuring program 160. The USB composite configuring program 160 may receive the switching signal and identify from the received switching signal the target mode to which the current mode of the USB device 100 is to be changed. Then, the USB composite configuring program 160 may configure the USB composite driver 150 which includes the USB function drivers 170 needed for the USB device 100 to operate in the target mode.

The USB device controller driver 180 may provide an interface by which the USB device 100 can perform USB communication with the USB host 200 in a wired/wireless manner. For example, the USB device controller driver 180 may receive a descriptor of the USB device 100 and transmit the received descriptor to the USB host 200. A USB host controller driver 280 may provide an interface by which the USB host 200 can perform USB communication with the USB device 100 in a wired/wireless manner.

Figure 3:
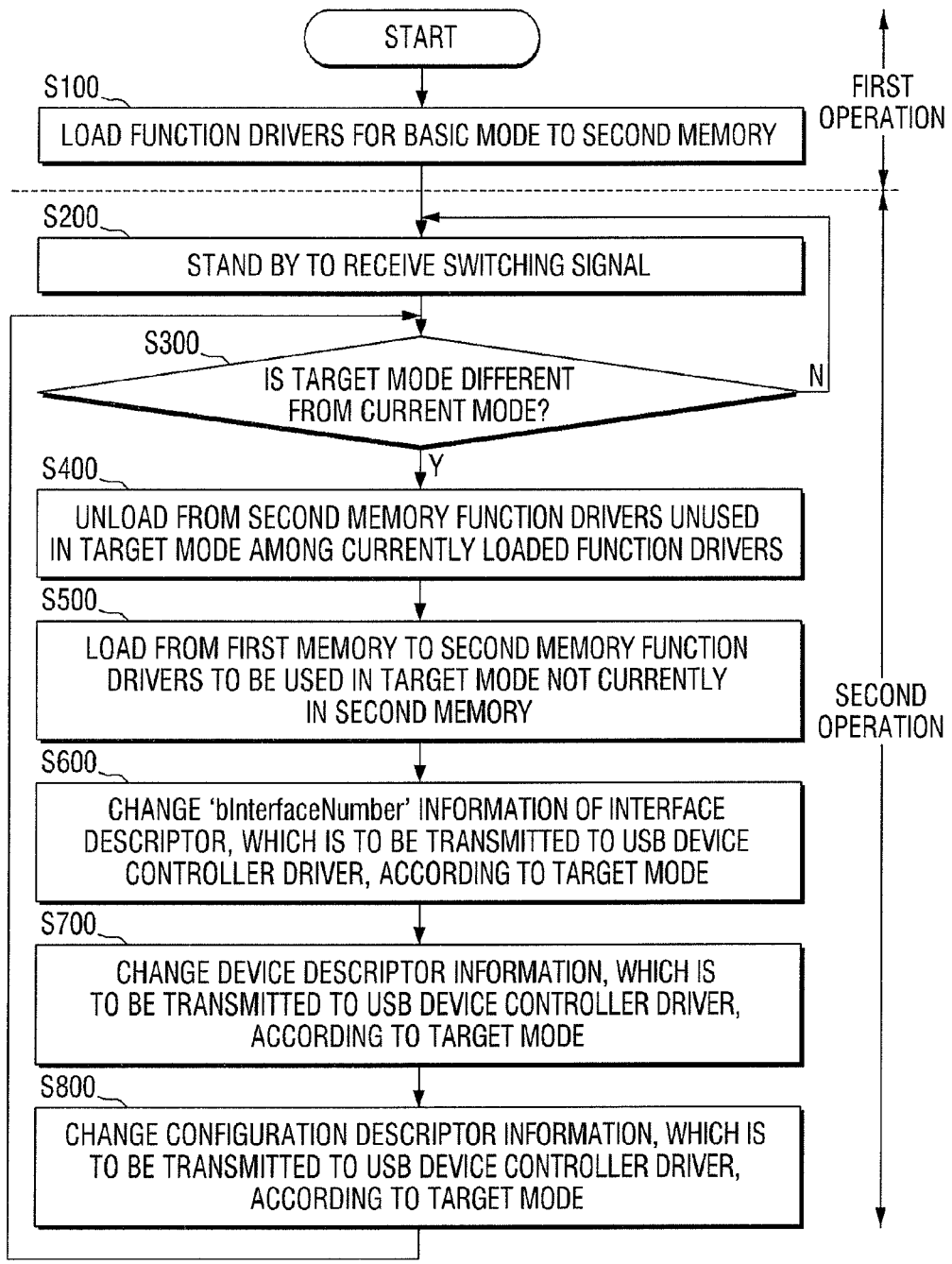
FIG. 3 is a flowchart illustrating a method of configuring a composite driver of the USB device according to an exemplary embodiment of the present inventive concept.
Figure 4:
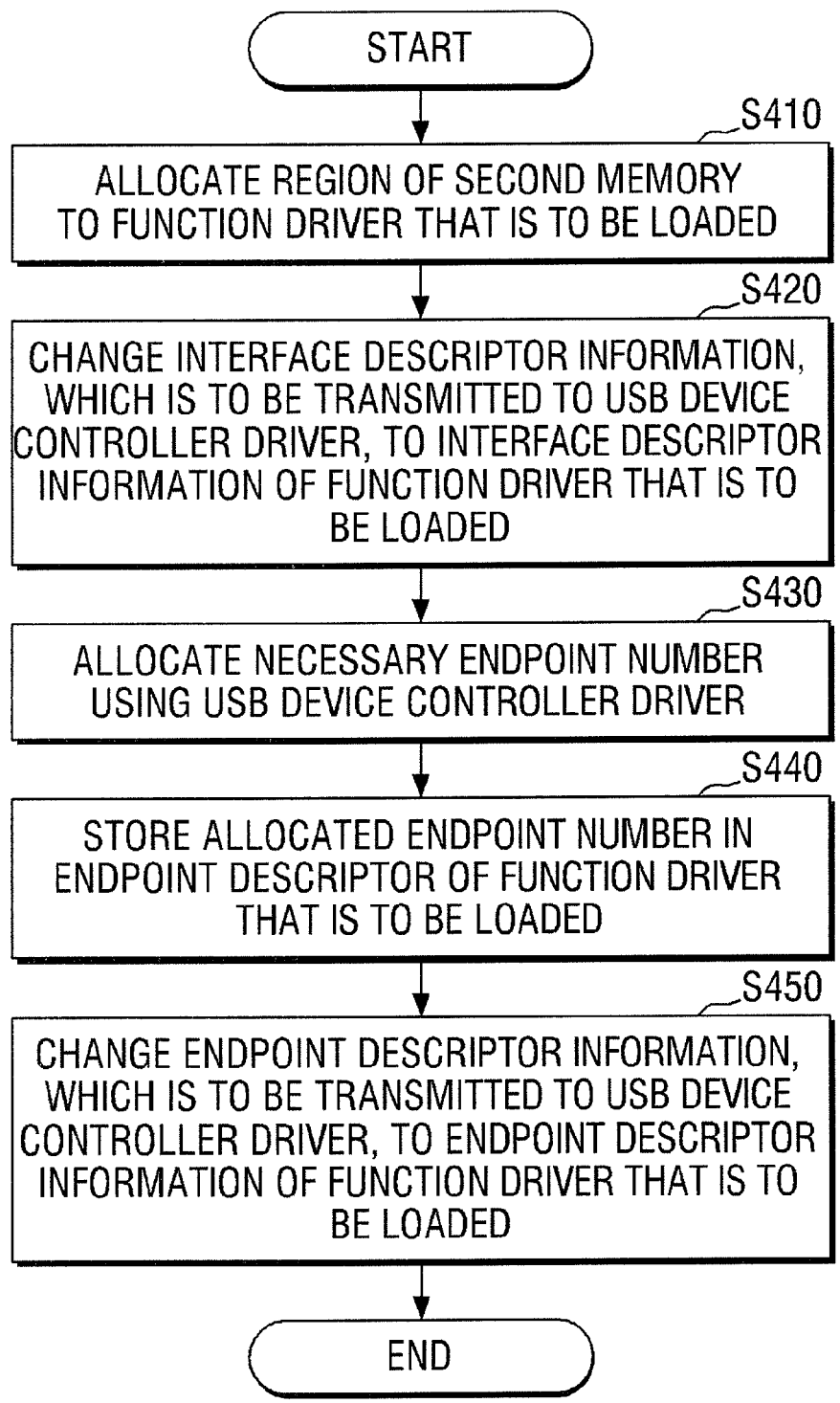
FIG. 4 is a flowchart illustrating a process of loading a function driver, according to an exemplary embodiment of the present inventive concept.
Figure 5:
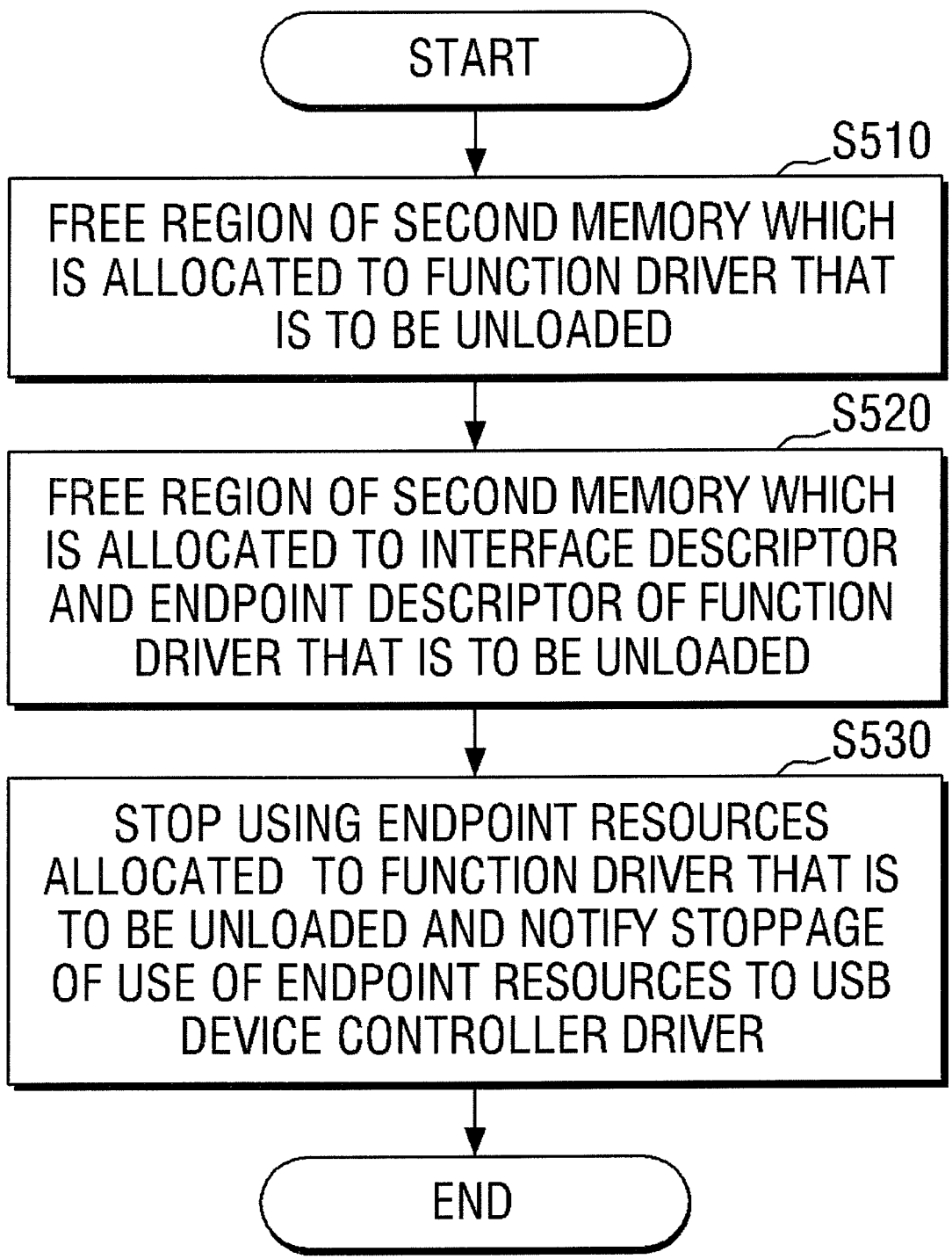
FIG. 5 is a flowchart illustrating a process of unloading a function driver, according to an exemplary embodiment of the present inventive concept.
Figure 6:
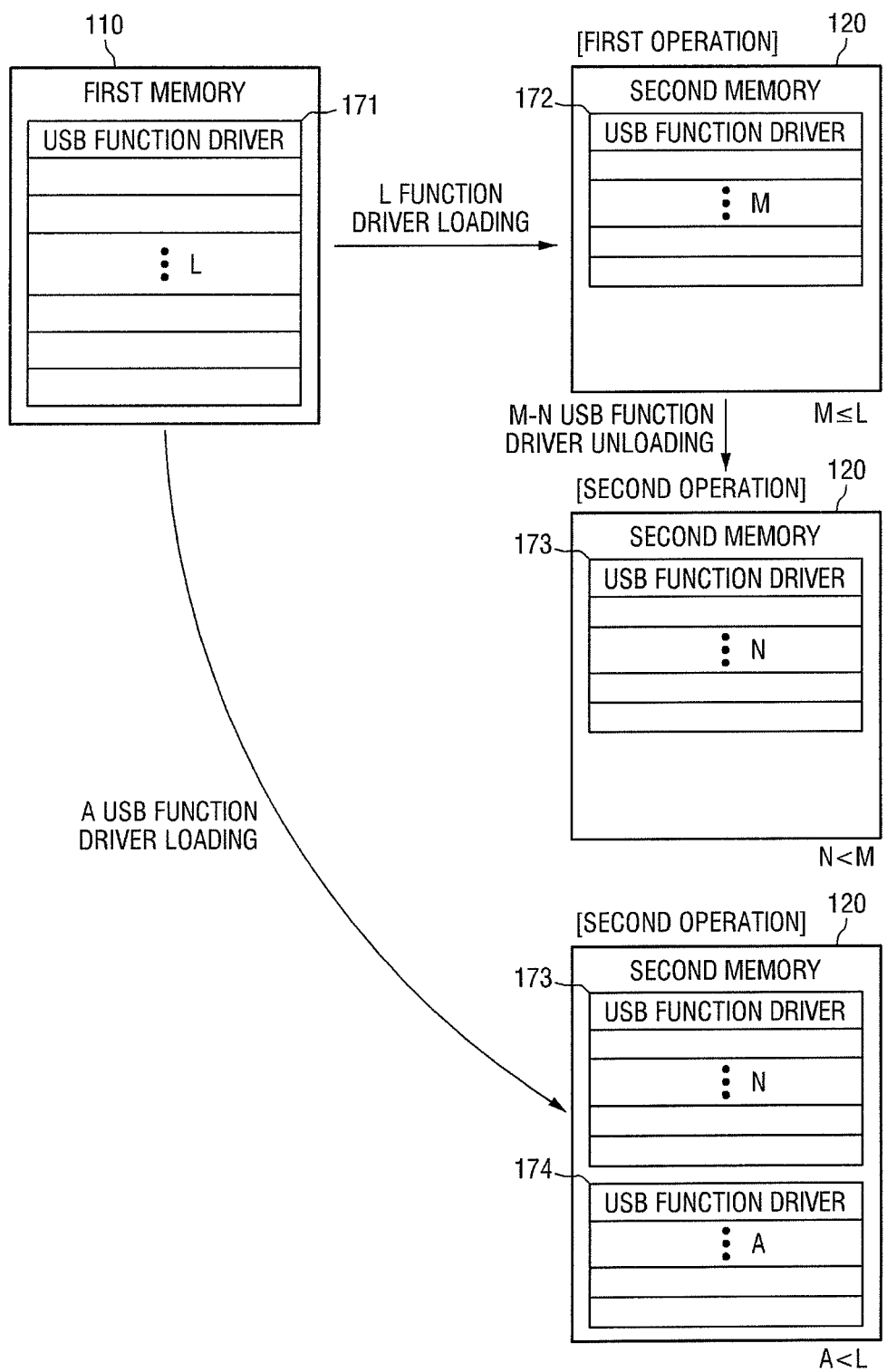
FIG. 6 is a block diagram illustrating the method of configuring a composite driver of the USB device according to an exemplary embodiment of the present inventive concept.
Figure 7:
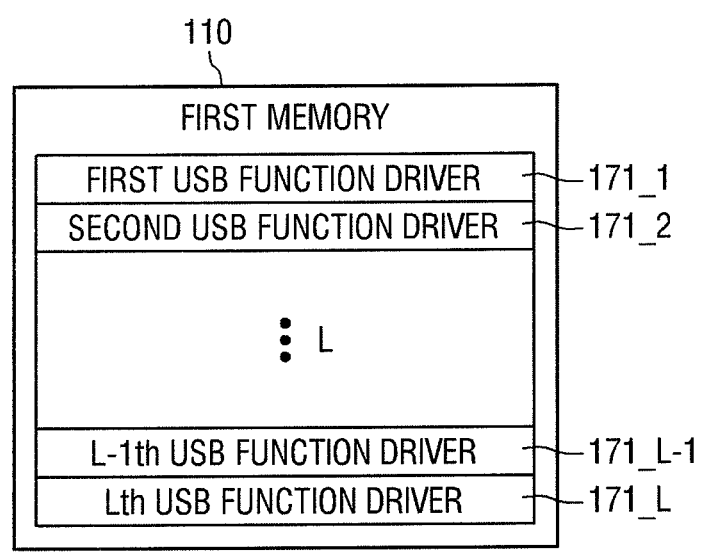
FIG. 7 is a block diagram of a first memory, according to an exemplary embodiment of the present inventive concept.
Figure 8:
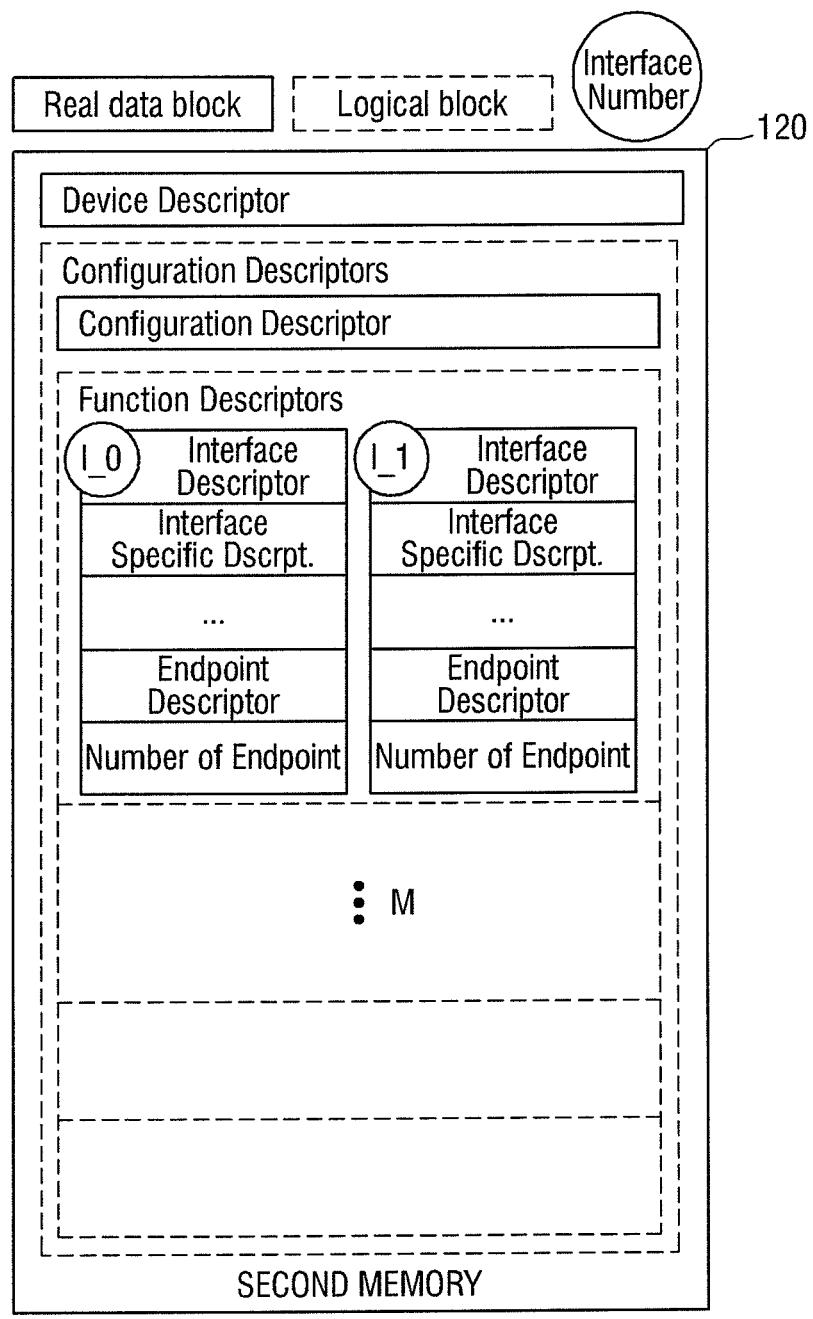
FIG. 8 is a diagram of descriptors in a first operation, according to an exemplary embodiment of the present inventive concept.
Figure 9:
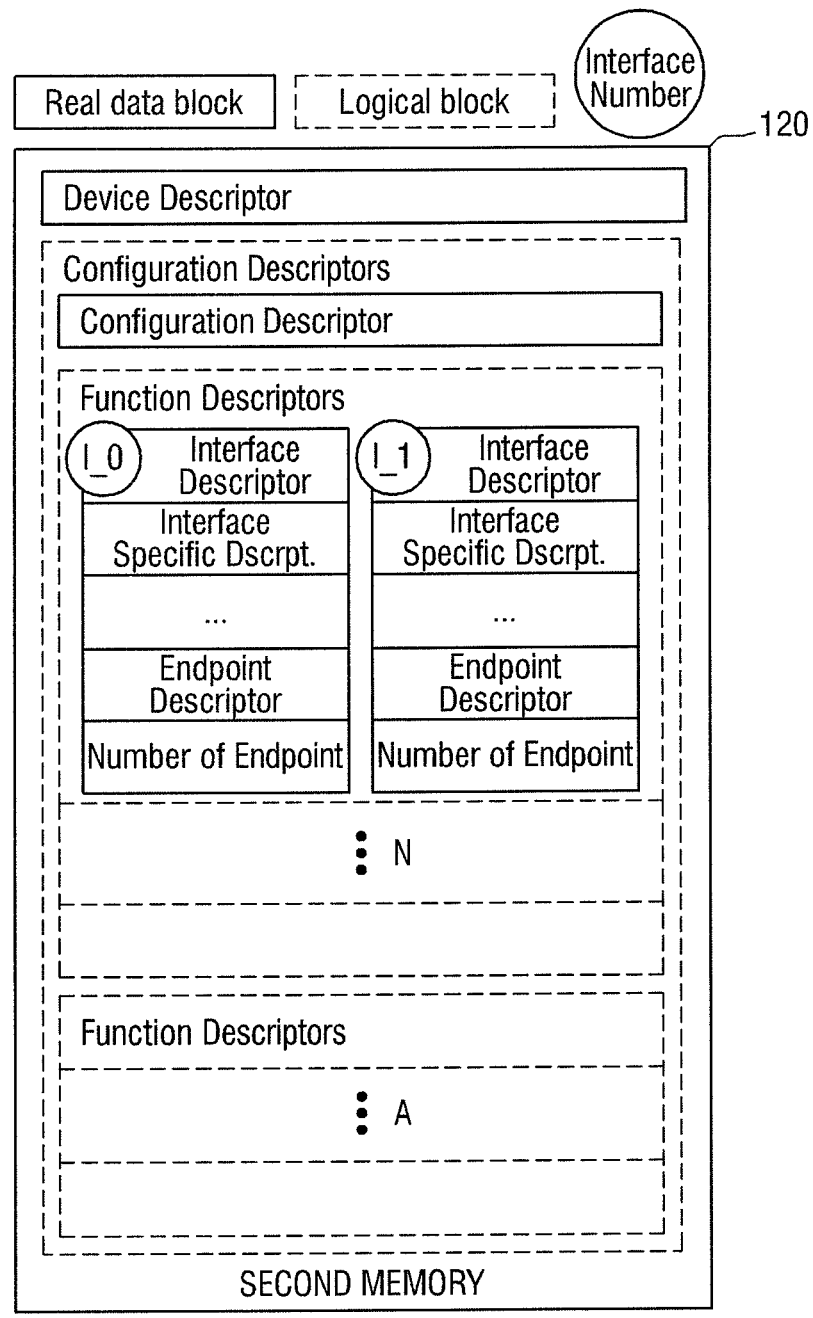
FIG. 9 is a diagram of descriptors in a second operation, according to an exemplary embodiment of the present inventive concept.
Figure 10:
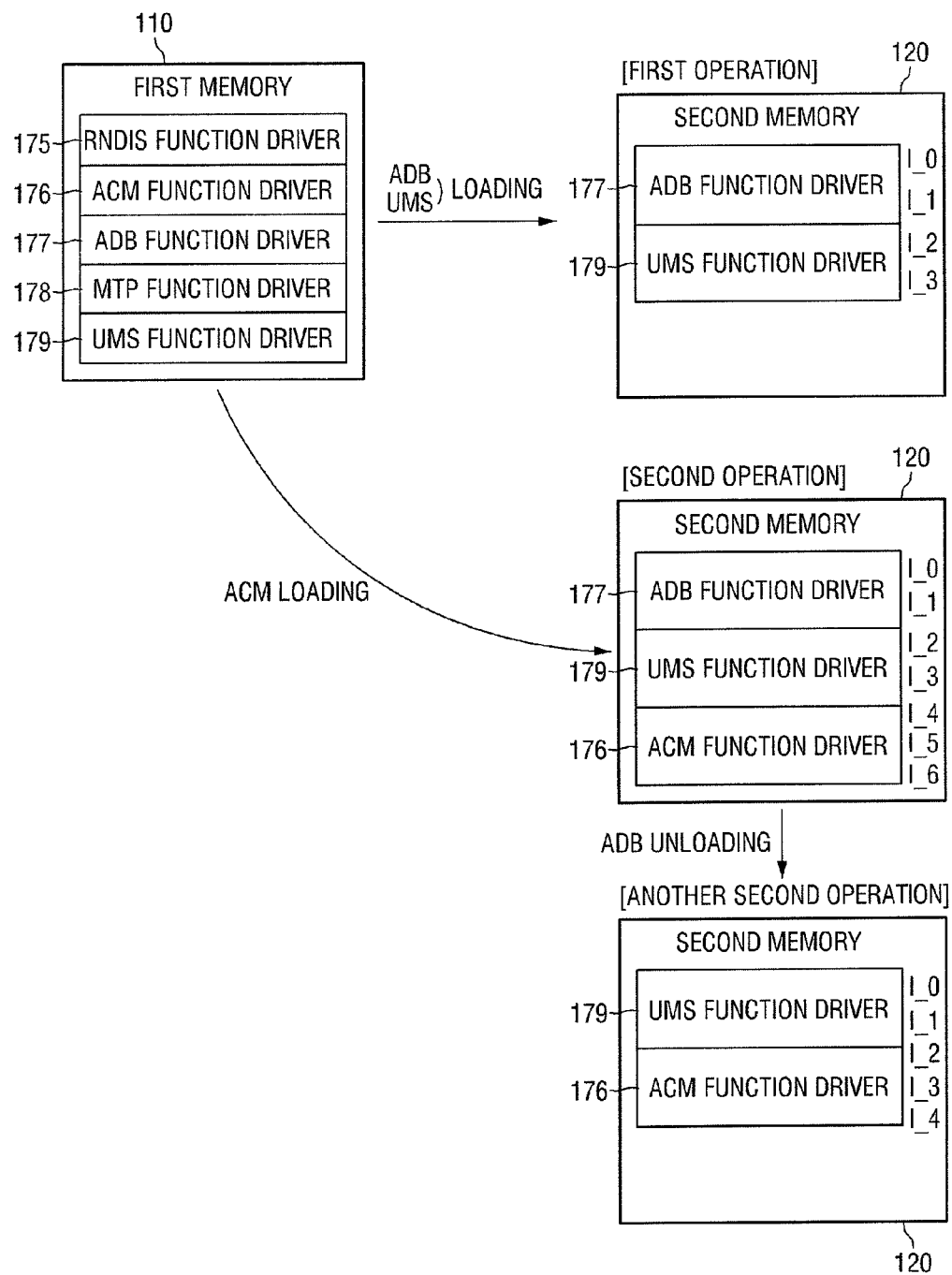
FIG. 10 is a block diagram illustrating a specific example of the method of configuring a composite driver of the USB device according to an exemplary embodiment of the present inventive concept.
Figure 11:
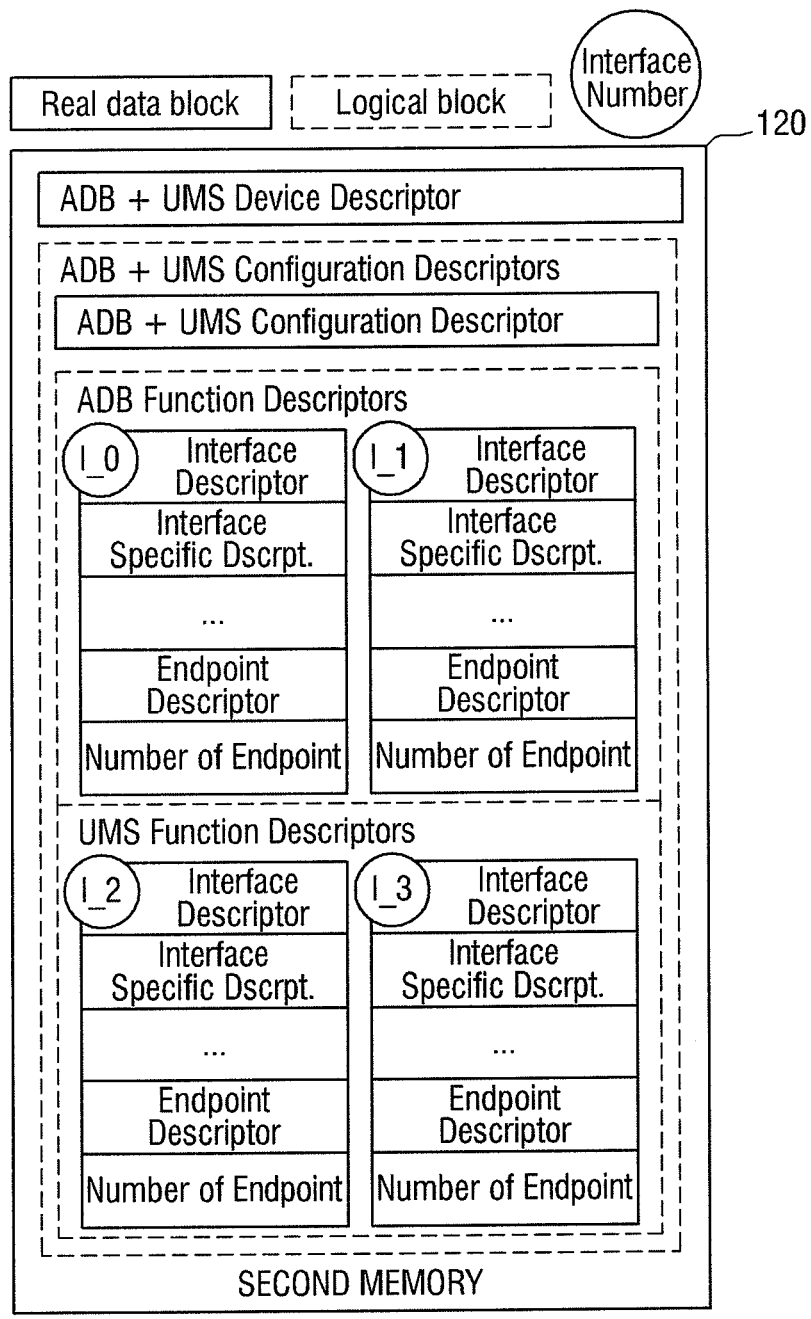
FIGS. 11 through 13 are diagrams of descriptors in the specific example of the method of configuring a composite driver of the USB device according to an exemplary embodiment of the present inventive concept.
Figure 12:
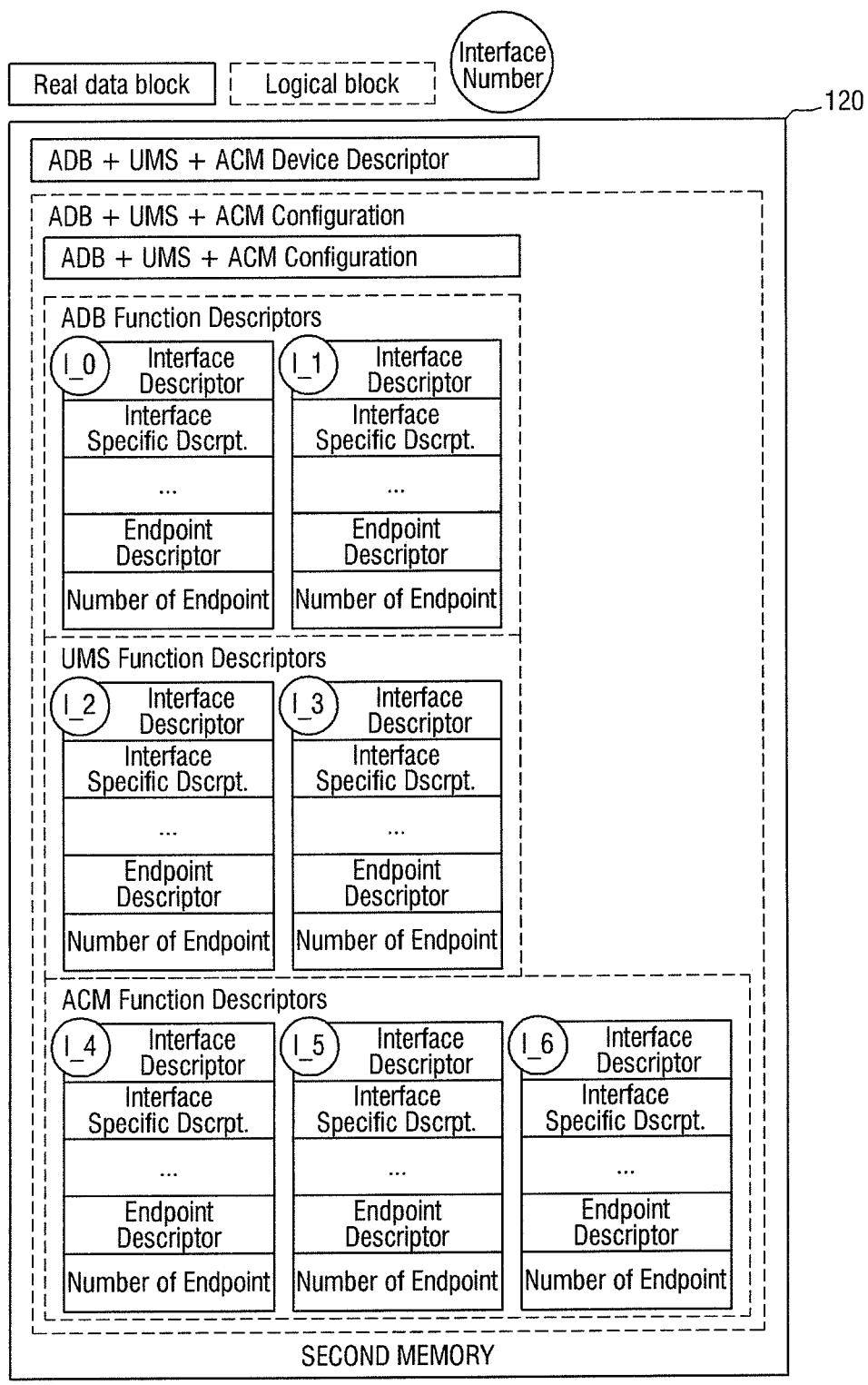
Figure 13:
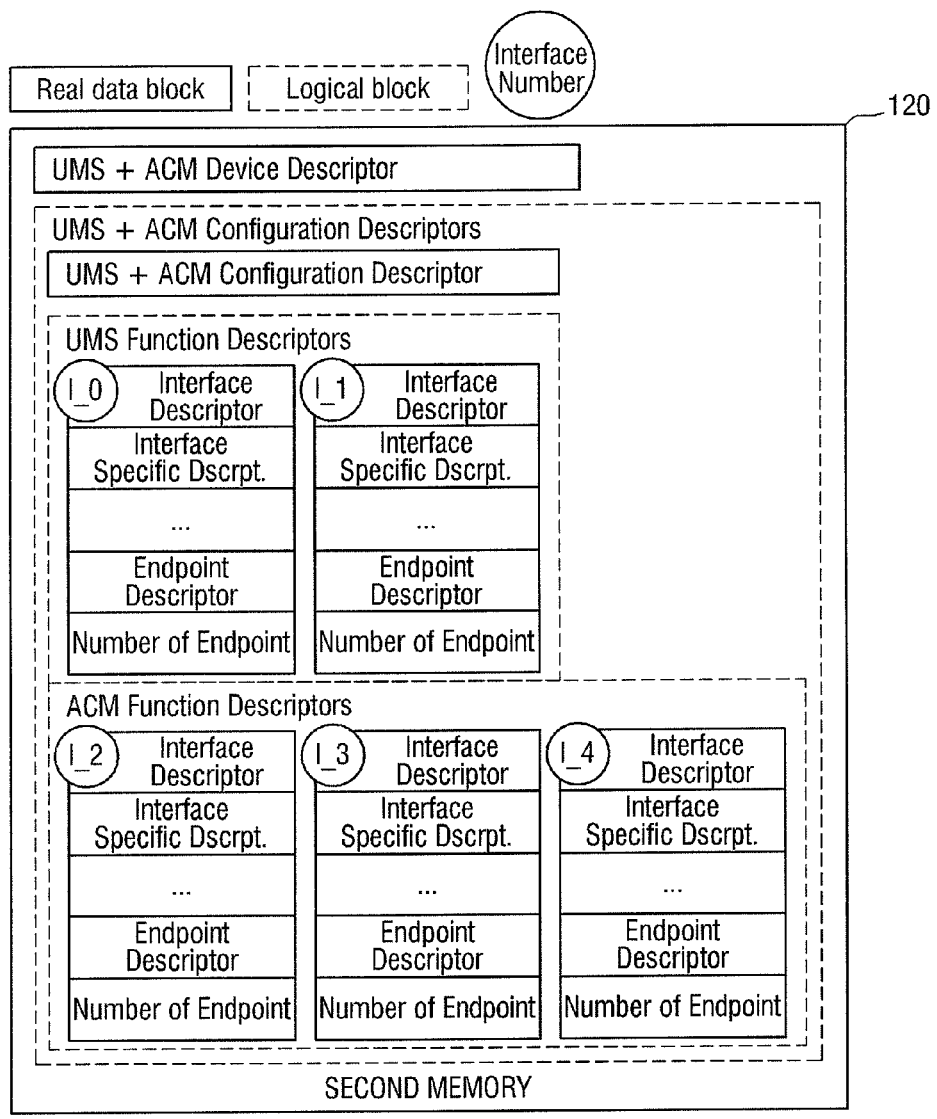

Hereinafter, a method of configuring a composite driver of the USB device 100 according to an exemplary embodiment of the present inventive concept will be described with reference to FIGS. 3 through 13. FIG. 3 is a flowchart illustrating a method of configuring a composite driver of the USB device 100 according to an exemplary embodiment of the present inventive concept. FIG. 4 is a flowchart illustrating a process of loading a function driver, according to an exemplary embodiment of the present inventive concept. FIG. 5 is a flowchart illustrating a process of unloading a function driver, according to an exemplary embodiment of the present inventive concept. FIG. 6 is a block diagram illustrating the method of configuring a composite driver of the USB device 100 according to an exemplary embodiment of the present inventive concept. FIG. 7 is a block diagram of the first memory 110, according to an exemplary embodiment of the present inventive concept. FIG. 8 is a diagram of descriptors in a first operation, according to an exemplary embodiment of the present inventive concept. FIG. 9 is a diagram of descriptors in a second operation, according to an exemplary embodiment of the present inventive concept. FIG. 10 is a block diagram illustrating a specific example of the method of configuring a composite driver of the USB device 100 according to an exemplary embodiment of the present inventive concept. FIGS. 11 through 13 are diagrams of descriptors in the specific example of the method of configuring a composite driver of the USB device 100 according to an exemplary embodiment of the present inventive concept.

The first operation of the USB device 100 according to an exemplary embodiment of the present inventive concept in the method of configuring a composite driver of the USB device 100 will now be described with reference to FIGS. 3, 4, 6 and 8.

Referring to FIGS. 3 and 6, USB function drivers needed to operate the USB device 100 (see FIG. 1) in a basic mode may be loaded to the second memory 120 (operation S100). Specifically, the USB composite configuring program 160 (see FIG. 2) may load USB function drivers needed to operate the USB 100 in the basic mode from the first memory 110 to the second memory 120, and the USB function drivers loaded to the second memory 120 may form a first USB composite driver.

The first memory 110 may store L different USB function drivers 171. Referring to FIG. 7, the L USB function drivers 171 may include first through $L^{th}$ USB function drivers 171_1 through 171_L which are different from each other. Each of the first through $L^{th}$ USB function drivers 171_1 through 171_L offers an interface for providing a different function. One USB function driver for each of the first through $L^{th}$ USB function drivers 171_1 through 171_L may be stored in the first memory 110. Since only one function driver for each type of USB function driver is stored in the first memory 110, a region occupied by USB function drivers in the first memory 110 can be minimized. Accordingly, this can reduce memory usage. In addition, when USB function drivers are repaired, since only one USB function driver for each type of USB function driver is repaired, repair cost can be reduced.

Referring back to FIGS. 3 and 6, the USB function drivers needed for the USB device 100 to operate in the basic mode may be M (M≤L) different USB function drivers 172. Therefore, the M USB function drivers 172 may be loaded from the first memory 110 to the second memory 120 by the USB composite configuring program 160 (see FIG. 2). The M USB function drivers 172 loaded to the second memory 120 may form the first USB composite driver.

The process of loading a USB function driver to the second memory 120 (see FIG. 6) will now be described in detail with reference to FIG. 4.

First, a region of the second memory 120 may be allocated to a USB function driver that is to be loaded to the second memory 120 (operation S410). Then, interface descriptor information that is to be transmitted to the USB device controller driver 180 (see FIG. 2) may be changed to interface descriptor information of the USB function driver that is to be loaded (operation S420).

An endpoint number corresponding to the number of endpoints needed by the USB function driver that is to be loaded may be allocated by the USB device controller driver 180 (operation S430). The endpoint number allocated by the USB device controller driver 180 may be stored in an endpoint descriptor of the USB function driver that is to be loaded (operation S440). For example, a 'bEndpointAddress' value of the endpoint descriptor of the USB function driver that is to be loaded may be set to the endpoint number allocated by the USB device controller driver 180.

Finally, endpoint descriptor information that is to be transmitted to the USB device controller driver 180 may be changed to endpoint descriptor information of the USB function driver that is to be loaded (operation S450).

Referring to FIG. 8, the second memory 120 includes descriptors that are to be transmitted to the USB device controller driver 180 (see FIG. 2). The descriptors that are to be transmitted to the USB device controller driver 180 may be descriptors that store data and may include a device descriptor, a configuration descriptor, an endpoint descriptor, and a function descriptor that is logically distinguished. The function descriptor is a descriptor corresponding to a USB function driver loaded to the second memory 120 and may include an interface descriptor and an endpoint descriptor related to the USB function driver.

The second memory 120 includes M function descriptors corresponding to the M loaded USB function drivers 172 (see FIG. 6), respectively. Interface descriptor information in the second memory 120 is changed to interface descriptor information of the M USB function drivers 172. In addition, endpoint descriptor information in the second memory 120 is changed to endpoint descriptor information of the M USB function drivers 172.

Next, the second operation of the USB device 100 according to an exemplary embodiment in the method of configuring a composite driver of the USB device 100 will be described with reference to FIGS. 2, 3, 5, 7, 8 and 10.

Referring to FIGS. 2 and 3, after the first operation, the USB device 100 may stand by to receive a switching signal (operation S200). Specifically, the USB device 100 may stand by until the USB composite device switching program 195 generates a switching signal and transmits the generated switching signal to the USB composite configuring program 160.

When the switching signal is transmitted from the USB composite device switching program 195 to the USB composite configuring program 160, the USB device 100 may identify whether its target mode is the same as its current mode (operation S300). The switching signal contains information about the target mode to which the current mode of the USB device 100 is to be changed. If the current and target modes of the USB device 100 are the same, there is no need to reconfigure a USB composite driver. Therefore, when the current and target modes of the USB device 100 are the same, the USB device 100 may stand by until a new switching signal is received.

However, if the current and target modes of the USB device 100 are different, the USB device 100 may reconfigure a USB composite driver.

Referring to FIGS. 3 and 6, among the USB function drivers currently loaded in the second memory 120, USB function drivers not used in the target mode of the USB device 100 may be unloaded from the second memory 120 (operation S400). Since the USB function drivers not used in the target mode are unloaded from the second memory 120, the region of the second memory 120 from which these unused USB function drivers were unloaded can be used efficiently, and malfunctions caused by these unused USB function drivers can be prevented.

USB function drivers that are to be used in the target mode of the USB device 100 (see FIG. 2) may include N different USB function drivers 173 and A different USB function drivers 174. Specifically, the N USB function drivers 173 are included in the M USB function drivers 172, and the A USB function drivers 174 are included in the L USB function drivers 171. The N USB function drivers 173 may be different from the A USB function drivers 174.

Consequently, the USB composite configuring program 160 (see FIG. 2) may configure a second USB composite driver to include the N USB function drivers 173 and the A USB function drivers 174. The second USB composite driver may provide an interface needed for the USB device 100 to operate in the target mode.

To configure the second USB composite driver such that the second USB composite driver includes the N USB function drivers 173 and the A USB function drivers 174, USB function drivers, which are not included in the N USB function drivers 173 and the A USB function drivers 174, among the M USB function drivers 172 currently loaded in the second memory 120 may be unloaded from the second memory 120. For example, (M−N) USB function drivers, which are not included in the N USB function drivers 173, among the M USB function drivers 172 may be unloaded from the second memory 120. Since the (M−N) USB function drivers are not used in the target mode, if they are unloaded from the second memory 120, the second memory 120 can be used efficiently.

Consequently, the (M−N) USB function drivers are unloaded from the second memory 120, and the N USB function drivers 173 may remain loaded in the second memory 120.

Since the N USB function drivers 173 to be used in the target mode remain loaded in the second memory 120, there is no need to reload the N USB function drivers 173 to configure the second composite driver. The removal of such an unnecessary operation during a mode change of the USB device 100 can ensure fast responsiveness of the USB device 100.

The process of unloading a USB function driver from the second memory 120 will now be described in detail with reference to FIG. 5.

First, a region of the second memory 120 which is being used by a USB function driver that is to be unloaded from the second memory 120 (see FIG. 6) may be freed (operation S510). Then, a region of the second memory 120 which is allocated to an interface descriptor and an endpoint descriptor of the USB function driver that is to be unloaded may be freed (operation S520). The use of endpoint resources allocated to this USB function driver by the USB device controller driver 180 (see FIG. 2) is stopped, and the stoppage of the use of the endpoint resources may be notified to the USB device controller driver 180 (operation S530).

Since a region that is not to be used in a target mode is freed through the unloading process, the second memory 120 can be used efficiently. In addition, since endpoint resources that can be used by the USB device 100 for USB communication are finite, stopping the use of endpoint resources that are not to be used in the target mode may enable efficient use of the finite endpoint resources. The endpoint resources that are stopped being used can be used for a USB function driver that is to be additionally loaded, for example.

Referring to FIG. 9, the second memory 120 includes function descriptors containing information about the N USB function drivers 173 (see FIG. 6) that are to be used in the target mode. However, the second memory 120 has no function descriptors containing information about the unloaded (M−N) USB function drivers. In other words, regions of the second memory 120 which were allocated to interface descriptors and endpoint descriptors possessed by the (M−N) USB function drivers have been freed.

Referring to FIGS. 3 and 6, among USB function drivers to be used in the target mode of the USB device 100, USB function drivers currently not loaded in the second memory 120 may be loaded from the first memory 110 to the second memory 120 (operation S500). Since additionally needed USB function drivers only are loaded to the second memory 120, the time required to load USB function drivers can be minimized, thereby ensuring fast responsiveness of the USB device 100.

To configure the second USB composite driver 150 such that the second USB composite driver 150 includes the N USB function drivers 173 and the A USB function drivers 174, USB function drivers, which are currently not loaded in the second memory 120, among the N USB drivers 173 and the A USB function drivers 174 may be loaded to the second memory 120. By additionally loading only USB function drivers currently not loaded in the second memory 120 among the USB function drivers needed for the USB device 100 to operate in the target mode, the time required to load USB function drivers can be minimized. Specifically, the A USB function drivers 174 among the USB function drivers to be used in the target mode are currently not loaded in the second memory 120. Therefore, the A USB function drivers 174 may be loaded from the first memory 110 to the second memory 120.

Referring to FIG. 9, the second memory 120 includes function descriptors of the A USB function drivers 174 (see FIG. 6). Specifically, the function descriptors may include interface information of the additionally loaded A USB function drivers 174 and information about endpoint resources for the additionally loaded A USB function drivers 174.

Referring back to FIG. 3, interface numbers may be allocated to function drivers loaded to the second memory 120 (see FIG. 6) for the operation of the USB device 100 (see FIG. 2) in the target mode (operation S600). Specifically, an interface number may be allocated by changing 'bInterfaceNumber' information of an interface descriptor that is to be provided to the USB device controller driver 180 (see FIG. 2). The method of allocating interface numbers may vary according to each mode of the USB device 100.

For example, interface numbers allocated to function drivers may increase sequentially from zero. However, the present inventive concept is not limited thereto. For example, if there is a predetermined method of allocating interface numbers to function drivers used in a certain mode of the USB device 100, interface numbers may be allocated to the function drivers according to the predetermined method.

Next, device descriptor information that is to be transmitted to the USB device controller driver 180 may be changed according to the target mode of the USB device 100 (operation S700).

Then, configuration descriptor information that is to be transmitted to the USB device controller driver 180 may be changed according to the target mode of the USB device 100 (operation S800).

As described above, during the second operation, USB function drivers needed for the USB device 100 to operate in a target mode may be loaded to the second memory 120. In addition, descriptor information that is to be transmitted to the USB device controller driver 180 may be changed according to the target mode. The changed descriptor information may be transmitted to the USB device controller driver 180, and the USB device controller driver 180 may transmit the received descriptor information to the USB host controller driver 280. Then, USB communication may be performed based on the descriptor information.

The second operation may be repeated in a loop manner. In other words, after changing the configuration descriptor information that is to be transmitted to the USB device controller driver 180 according to the target mode, the USB device 100 may stand by to receive a new switching signal and may repeat the second operation.

The method of configuring a composite driver of the USB device 100 according to an exemplary embodiment of the present inventive concept will be described using a specific example and with reference to FIGS. 10 through 13.

First, the first operation of the USB device 100 (see FIG. 2) will be described with reference to FIGS. 10 and 11.

Referring to FIG. 10, the USB device 100 may load an ANDROID™ debug bridge (ADB) function driver 177 and a UMS function driver 179 from the first memory 110 to the second memory 120.

A plurality of different function drivers, which can be used in the USB device 100, may be stored in the first memory 110. Here, only one function driver for each type of function driver may be stored in the first memory 110. The first memory 110 may include, for example, an RNDIS function driver 175, an abstract control model (ACM) function driver 176, the ADB function driver 177, an MTP function driver 178, and the UMS function driver 179.

For example, the ADB function driver 177 and the UMS function driver 179 may be used in the basic mode of the USB device 100. In the first operation of the USB device 100, the ADB function driver 177 and the UMS function driver 179 may be loaded from the first memory 110 to the second memory 120. In addition, interface numbers I_0 and I_1 may be allocated to the ADB function driver 177 and interface numbers I_2 and I_3 may be allocated to the UMS function driver 179.

Referring to FIG. 11, descriptors that are to be transmitted to the USB device controller driver 180 (see FIG. 2) may be located in the second memory 120. The descriptors of FIG. 11 may be for operating the USB device 100 in the basic mode. It can be seen from FIG. 11 that interface numbers I_0, I_1, I_2 and I_3 are allocated to interface descriptors.

The second operation of the USB device 100 will now be described with reference to FIGS. 10 and 12.

Referring to FIG. 10, when the USB composite configuring program 160 (see FIG. 2) receives a switching signal and when it is determined that a current mode and a target mode are different, the ADB function driver 177 and the UMS function driver 179 may remain loaded in the second memory 120, and the ACM function driver 176 may be additionally loaded.

The ADB function driver 177 and the UMS function driver 179 currently loaded in the second memory 120 are function drivers that will be used in the target mode of the USB device 100. Thus, they may remain loaded in the second memory 120. Among function drivers to be used in the target mode of the USB device 100, the ACM function driver 176 is currently not loaded in the second memory 120. Therefore, the ACM function driver 176 may be additionally loaded from the first memory 110 to the second memory 120.

Referring to FIG. 12, ACM function descriptors are added to the second memory 120 which stores ADB function descriptors and UMS function descriptors. Referring to interface descriptors, interface numbers I_0, I_1, I_2 and I_3 of the ADB function driver 177 and the UMS function driver 179 are the same as the interface numbers of the ADB function driver 177 and the UMS function driver 179 shown in FIG. 11, and new interface numbers I_4, I_5 and I_6 are allocated to the additionally loaded ACM function driver 176.

Another second operation of the USB device 100 will now be described with reference to FIGS. 10 and 13.

Referring to FIG. 10, when the USB composite configuring program 160 (see FIG. 2) receives a new switching signal and when it is determined that a current mode and a target mode are different, only the ADB function driver 177 may be unloaded from the second memory 120.

Since the UMS function driver 179 and the ACM function driver 176 currently loaded in the second memory 120 are used in the target mode of the USB device 100, they may remain loaded in the second memory 120. However, the ADB function driver 177 currently loaded in the second memory 120 is not used in the target mode of the USB device 100. Thus, the ADB function driver 177 may be unloaded from the second memory 120.

Referring to FIG. 13, interface numbers I_0 and I_1 are newly allocated to the UMS function driver 179 and interface numbers I_2, I_3 and I_4 are newly allocated to the ACM function driver 176. Here, the interface numbers are allocated sequentially from zero.

Figure 14:
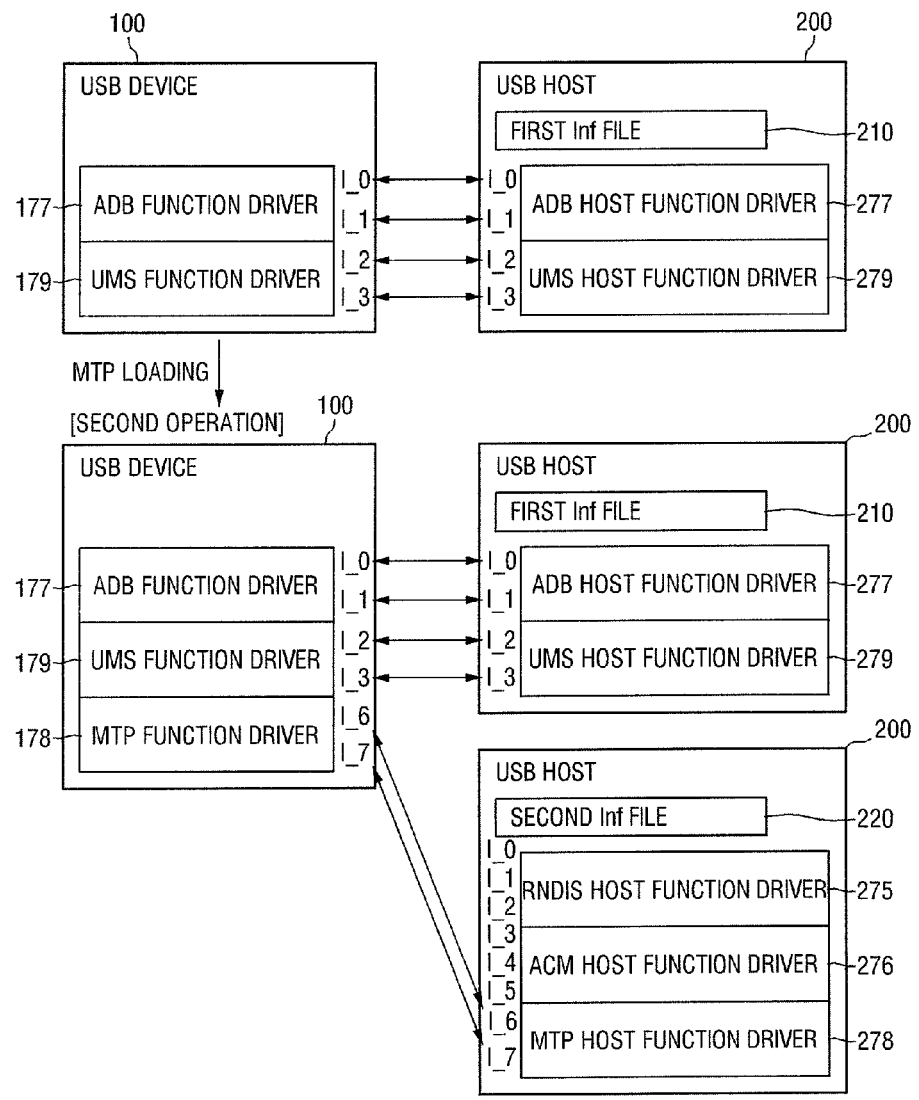
FIG. 14 is a block diagram illustrating an interface number allocation method used by a USB device according to an exemplary embodiment of the present inventive concept.

Hereinafter, a USB device and a USB system according to an exemplary embodiment of the present inventive concept will be described with reference to FIGS. 2, 6 and 14. The following description will focus on differences between this embodiment of the present inventive concept and that previously described. FIG. 14 is a block diagram illustrating an interface number allocation method used by a USB device 100 according to an exemplary embodiment of the present inventive concept.

Referring to FIGS. 2 and 14, a USB host 200 includes host function drivers corresponding to USB function drivers of the USB device 100. The USB function drivers of the USB device 100 may be logically connected to the host function drivers of the USB host 200. To this end, the same interface numbers may be allocated to host function drivers and USB function drivers corresponding to the host function drivers.

In the USB host 200, an Inf file (e.g., an information or setup information file) may manage host function drivers and interface numbers of the host function drivers. For example, the Inf file may store host function drivers corresponding to USB function drivers needed to operate the USB device 100 in a certain mode and interface numbers allocated to the host function drivers. In the USB system 1 according to the previously described exemplary embodiment of the present inventive concept, it is assumed that an Inf file storing host function drivers, which correspond to USB function drivers needed in each mode of the USB device 100, and interface numbers allocated to the host function drivers is configured. Therefore, in the USB system 1 according to the previously described exemplary embodiment of the present inventive concept, the USB host 200 needs to configure a new Inf file whenever USB function drivers to be loaded are changed for each mode change of the USB device 100.

In the USB system according to the current exemplary embodiment of the present inventive concept, however, the USB host 200 does not need to configure a new Inf file for each mode change of the USB device 100. Instead, an existing Inf file may be used. In the USB system according to the current exemplary embodiment of the present inventive concept, an Inf file including host function drivers corresponding to USB function drivers newly loaded to a second memory 120 of the USB device 100 may be retrieved, and the same interface numbers as those of the host function drivers in the Inf file may be allocated to the newly loaded USB function drivers.

The interface number allocation method used by the USB device 100 according to the current exemplary embodiment of the present inventive concept will now be described in detail with reference to FIG. 6.

In a first operation, when M USB function drivers 172 are loaded to the second memory 120, the USB host 200 (see FIG. 14) may configure a first Inf file 210 which stores M host function drivers corresponding to the M USB function drivers 172. The M USB function drivers 172 and the M host function drivers may be allocated with the same interface numbers. The interface numbers allocated to the M host function drivers may be stored in the first Inf file 210. Consequently, the M USB function driver 172 may be allocated with the same interface numbers as those stored in the first Inf file 210.

In a second operation, interface numbers of N USB function drivers 173 which remain loaded in the second memory 120 may be maintained. In addition, A function drivers 174 newly loaded to the second memory 120 may be allocated with the same interface numbers as interface numbers stored in a second Inf file 220 which includes host function drivers corresponding to the A function drivers 174. In this way, the USB host 200 can reuse an existing Inf file at each mode change without generating a new Inf file.

Referring to FIG. 14, an ADB function driver 177 and a UMS function driver 179 loaded to the second memory 120 before a mode change maintain the same interface numbers as those stored in the existing first Inf file 210. In addition, an additionally loaded MTP function driver 178 is allocated with the same interface numbers as those allocated to an MTP host function driver 278 in the second Inf file 220. Therefore, even when the mode of the USB device 100 is to be changed to a target mode, the USB host 200 does not need to generate a new Inf file corresponding to the target mode.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A universal serial bus (USB) device, comprising: a nonvolatile memory configured to store a plurality of USB function drivers, a function of each USB function driver of the plurality of USB function drivers being different from functions of remaining USB function drivers among the plurality of USB function drivers;
   a volatile memory configured to receive at least one USB function driver among the plurality of USB function drivers from the nonvolatile memory;
   a USB device port configured to connect to an external device; and
   a USB controller driver configured to receive descriptor information containing interface information,
   wherein one of the plurality of USB function drivers is configured to enable file transfers between the USB device port and the external device,
   wherein when M number of USB function drivers among the plurality of USB function drivers are loaded from the nonvolatile memory into the volatile memory, endpoint resources are allocated to the M number of USB function drivers,
   wherein M is a positive integer,
   wherein when N number of USB function drivers are unloaded from the volatile memory to the nonvolatile memory, endpoint resources corresponding to the N number of USB function drivers are freed, and
   wherein N is a positive integer that is different from M.

2. A universal serial bus (USB) device, comprising: a nonvolatile memory configured to store a plurality of USB function drivers, a function of each USB function driver of the plurality of USB function drivers being different from functions of remaining USB function drivers among the plurality of USB function drivers;
   a volatile memory configured to receive at least one USB function driver among the plurality of USB function drivers from the nonvolatile memory; and
   a USB device port configured to connect to an external device,
   wherein one of the plurality of USB function drivers is configured to enable file transfers between the USB device port and the external device,
   wherein when M number of USB function drivers among the plurality of USB function drivers are loaded from the nonvolatile memory into the volatile memory, endpoint resources are allocated to the M number of USB function drivers,
   wherein M is a positive integer,
   wherein when N number of USB function drivers are unloaded from the volatile memory to the nonvolatile memory, endpoint resources corresponding to the N number of USB function drivers are freed, and
   wherein N is a positive integer.

3. The USB device of claim 2, wherein the plurality of USB function drivers include a network driver interface specification (RNDIS) function driver.

4. The USB device of claim 2, wherein the plurality of USB function drivers are configured to enable the USB device to provide a serial communication interface to the external device.

5. The USB device of claim 2, wherein the plurality of USB function drivers include an ANDROID™ debug bridge (ADB) USB function driver.

6. The USB device of claim 2, wherein when the M number of USB function drivers are loaded into the volatile memory, interface numbers are allocated to the M number of USB function drivers.

7. A method of operating a universal serial bus (USB) device including a nonvolatile memory and a volatile memory, the nonvolatile memory being configured to store L number of USB function drivers, comprising:
    loading M number of USB function drivers from the nonvolatile memory into the volatile memory when a target operation mode is different from a current operation mode;
    unloading N number of USB function drivers from the volatile memory, the N number of USB function drivers being unused in the target operation mode;
    maintaining P number of USB function drivers in the volatile memory in the target operation mode, the P number of USB function drivers being used in the target operation mode,
    wherein a function of each USB function driver of the plurality of USB function drivers is different from functions of remaining USB function drivers among the L number of USB function drivers,
    L is equal to or greater than M,
    L is equal to or greater than N,
    L is equal to or greater than P, and
    each of L, M, N, P is a positive integer,
    the method further comprising:
    making endpoint resources freed that are allocated to the N number of USB function drivers; and
    allocating endpoint resources to the M number of USB function drivers.

8. The method of claim 7, further comprising: allocating interface numbers to M different USB function drivers.

9. The method of claim 8, further comprising: receiving the target operation mode.

10. The method of claim 7, wherein one of the L number of USB function drivers is configured to provide a virtual Ethernet link to a Windows operating system.

11. The method of claim 7, wherein the L number of USB function drivers include a remote network driver interface specification (RNDIS) function driver.

12. The method of claim 7, wherein the L number of USB function. drivers include an abstract control model (ACM) function driver.

13. The method of claim 7, wherein the L number of USB function drivers include a USB mass storage (UMS) function driver.

14. The method of claim 7, wherein the L number of USB function drivers include an ANDROID™ debug bridge (ADB) USB function driver.

* * * * *